United States Patent
Juretzek et al.

(10) Patent No.: US 11,889,531 B2
(45) Date of Patent: Jan. 30, 2024

(54) METHOD FOR OFFLOADING CONTROL DATA IN A MOBILE NETWORK

(71) Applicant: TDF, Montrouge (FR)

(72) Inventors: Frieder Juretzek, Braunschweig (DE); Stefan Ilsen, Braunschweig (DE)

(73) Assignee: TDF, Montrouge (FR)

( * ) Notice: Subject to any disclaimer, the term of this patent is extended or adjusted under 35 U.S.C. 154(b) by 69 days.

(21) Appl. No.: 16/644,698

(22) PCT Filed: Aug. 29, 2018

(86) PCT No.: PCT/EP2018/073283
§ 371 (c)(1),
(2) Date: Mar. 5, 2020

(87) PCT Pub. No.: WO2019/048317
PCT Pub. Date: Mar. 14, 2019

(65) Prior Publication Data
US 2020/0288429 A1    Sep. 10, 2020

(30) Foreign Application Priority Data

Sep. 8, 2017 (EP) .................................... 17306165

(51) Int. Cl.
*H04W 72/00* (2023.01)
*H04W 72/30* (2023.01)
(Continued)

(52) U.S. Cl.
CPC ............. *H04W 72/30* (2023.01); *H04W 4/06* (2013.01); *H04W 72/27* (2023.01); *H04W 76/40* (2018.02)

(58) Field of Classification Search
None
See application file for complete search history.

(56) References Cited

U.S. PATENT DOCUMENTS 8,989,021 B2   3/2015 Simon
9,480,056 B2   10/2016 Hammarwall et al.
(Continued)

FOREIGN PATENT DOCUMENTS

WO   WO-2016040597 A1   3/2016
WO   WO-2016198734 A1   12/2016
WO   WO-2017023422 A1   2/2017

OTHER PUBLICATIONS

Frieder Juretzek, Integration of High Tower, High Power LTE-Advanced Broadcast into Mobile Network, Institute for Communication Technology (IfN) 2016 IEEE International Symposium on Broadband Multimedia System and Broadcasting (BMSB) pp. 1-6, Jun. 1, 2016._ (Year: 2016).*

(Continued)

*Primary Examiner* — Noel R Beharry
*Assistant Examiner* — Pamit Kaur
(74) *Attorney, Agent, or Firm* — Faegre Drinker Biddle & Reath LLP

(57) ABSTRACT

The invention relates to a method for sending control data in a hybrid wireless/broadcast network system, said network system comprising a broadcast network dedicated to transmission of broadcast services through at least a broadcast cell and a wireless network dedicated to transmission of at least a service through a plurality of cells, a cover area of the broadcast cell covering, at least partially, a cover area of a first cell and a cover area of a second cell among the plurality of cells, said method comprising: when control data related to a service of the first cell is identical to control data related to a service of a second cell, sending the control data through the broadcast cell.

20 Claims, 5 Drawing Sheets

(51) Int. Cl.
  *H04W 76/40* (2018.01)
  *H04W 4/06* (2009.01)
  *H04W 72/27* (2023.01)

(56) References Cited

U.S. PATENT DOCUMENTS

| | | | |
|---|---|---|---|
| 2010/0263012 A1* | 10/2010 | Huang | H04L 65/1101 |
| | | | 725/116 |
| 2012/0188878 A1 | 7/2012 | Simon | |
| 2014/0029501 A1 | 1/2014 | Maehara et al. | |
| 2014/0126457 A1 | 5/2014 | Gou et al. | |
| 2015/0263832 A1* | 9/2015 | Takeda | H04J 13/10 |
| | | | 370/329 |
| 2016/0057463 A1 | 2/2016 | Ilsen et al. | |
| 2018/0014246 A1* | 1/2018 | Chang | H04W 4/06 |

OTHER PUBLICATIONS

International Search Report and Written Opinion, corresponding International Application No. PCT/EP2018/073283, dated Oct. 17, 2018.

Frieder Juretzek, Integration of High Tower, High Power LTE-Advanced Broadcast into Mobile Network, Institute for Communication Technology (IfN) 2016 IEEE International Symposium on Broadband Multimedia System and Broadcasting (BMSB) pp. 1-6, Jun. 1, 2016.

Richter et al., System-Level Simulation of a Multilayer Broadcast and Broadband System, Institute for Communication Technology (IfN) 2017 IEEE International Symposium on Broadband Multimedia System and Broadcasting (BMSB), pp. 1-9, Jun. 7, 2017.

DVB Technical Module "TM-CSU Draft Study Mission Report v1.0" pp. 1-85, Jan. 9, 2014.

GatesAir, LTE Mobile Offload using DVB-T2, NFO Meeting Oct. 7, 2015 Den Haag, pp. 1-30.

Kurner et al., Register of Commission doucment, Final Report, A study of future spectrum requirements for terrestrial TV and mobile services and other radio applications in the 470-790 MHz frequency band, including an evaluation of the options for sharing frequency use from a number of socioeconomic and frequency technology perspectives, particularly in the 694-790 MHz frequency sub-band, Jan. 21, 2013.

Martyn Horspool, GatesAir LTE Mobile Offload, Technology and Business Model for off-loading payload from Law Tower, Low Power networks to High Tower, High Power networks, ABU Digital Broadcasting Symposium, Mar. 2, 2015.

* cited by examiner

METHOD FOR OFFLOADING CONTROL DATA IN A MOBILE NETWORK

CROSS REFERENCE TO RELATED APPLICATIONS

This application is the U.S. National Phase of International Patent Application No. PCT/EP2018/073283 filed on Aug. 29, 2018, which claims the benefit of priority of European Patent Application No. 17306165.6 filed Sep. 8, 2017, the respective disclosures of which are each incorporated herein by reference in their entireties.

The present invention generally relates to the transmission of wireless signals to user equipments and in particular to the transmission of control data in a wireless network.

It finds application, in particular while not exclusively, in systems that enable to offload broadcast services from a cellular network, such as an LTE mobile network, in particular LTE-Advanced, which is initially dedicated to unicast services, to an existing broadcast network. Such networks aim in particular at relieving mobile networks by offloading broadcast contents, such as video contents, to existing High Tower, High Power (HTHP) transmitters of broadcast networks. This system is hereafter called Tower Overlay over LTE-Advanced+, TOoL+.

Within the framework of the present invention, a hybrid broadcast/wireless network encompasses any network or network system that comprises at least a broadcast network dedicated to transmission of broadcast services and at least a wireless network.

LTE-Advanced describes the latest evolution of cellular transmission standards developed by the 3GPP (Third Generation Partnership Project).

For example, when LTE-A broadcast data are offloaded to HTHP transmitters, the data transmitted by the HTHP transmitters can be referred to as LTE-A+ data.

In contrast to cellular networks, traditional HTHP terrestrial broadcast networks offer a low cost alternative to cover wide areas with broadcast and multicast services.

Traditional terrestrial broadband network like an LTE-A network, transmit to each user equipment control data related to the cell in which the user equipment is and to the services provided to the user equipment. Part of those control data are broadcast to all the user equipment in the same cell, such control data, referred hereinafter as broadcast control data. Some of these broadcast control data may be sent identically through several cells of a same network, such control data, referred hereinafter as common control data. Therefore, in each cell of the broadband network, or at least in several cells of the broadband network, the same control data is sent to the user equipment of these cells. Thus the load of each cell is impacted by these common control data.

There is therefore a need to reduce the incidence of the common control data on the load of the cells of the broadband networks.

The present invention aims at improving the situation.

To this end, the invention relates to a method for sending control data in a hybrid wireless/broadcast network system, said network system comprising a broadcast network dedicated to transmission of broadcast services through at least a broadcast cell and a wireless network dedicated to transmission of at least a service through a plurality of cells, a cover area of the broadcast cell covering, at least partially, a cover area of a first cell and a cover area of a second cell among the plurality of cells, said method comprising:

when control data related to a service of the first cell is identical to control data related to a service of a second cell, sending the control data through the broadcast cell.

This enables to send the common control data, intended to be sent through several cells of the broadband network, through a unique cell of a broadcast network. That is, to send the control data through the broadcast cell instead of the first cell and the second cell. This unique cell is geographically wider than the cell of the broadband network. This enables to reduce the aggregated load in the overall mobile network and the load of each cell of the wireless network.

Common control data may be broadcast control data, that is, control data that is broadcasted to all the user equipment of the same cell, contrary to user control data.

By cover area of the cell it is understood the geographical area in the field of the antenna of this cell, that is, in which the terminals in this geographical area may receive services from this cell.

By service of a cell it is understood any service provided by or through a cell. The service may be a unicast service, for example a telephony communication, multicast service or broadcast service.

It may also be advantageous to consider that the cover area of the broadcast cell covers integrally the cover area of the first cell and the cover area of the second cell.

According to some embodiments of the invention the wireless network is a broadband network dedicated to transmission of at least a unicast service through the plurality of cell. The service of the first and second cells may be this unicast service.

By broadband network it is referred to wireless communication network allowing two-way communication with the mobile terminals of this network.

According to some embodiments of the invention the transmission of the broadcast services through the at least broadcast cell is performed via a high tower high power broadcast network.

High tower high power (HTHP) enables to have a covering area of the broadcast cell which may cover many covering areas of cells from the wireless network. Therefore, it enables to implement the method on a large scale.

High tower high power relates to antenna used for example in TV broadcast networks.

According to some embodiments of the invention the control data is transmitted in a system information block, SIB. Alternatively, the control data is transmitted in a Master Information Block, MIB.

According to some embodiments of the invention the control data is data related to a wireless network configuration, for example information about the mobile network operator configuration or the general carrier settings.

According to some embodiments of the invention the control data is data related to a configuration of multicast services. In other words, the control data is data related to configuration of common data services such as eMBMs, emergency warning system or carrier aggregation signaling.

According to some embodiments of the invention the broadband network is a LTE-Advanced network.

According to some embodiments of the invention the control data may contain one of the following information:
an absolute radio-frequency channel number;
an MIB information;
a SIB-1 public land mobile network information;
a SIB-1 scheduling information list;
a SIB cross carrier signaling;
a SIB-2 MBSFN subframe configuration;
a SIB-13 MBSFN area information;
a SIB-15 MBMS Inter-frequency list.

These information are examples of common data in the LTE standard. In addition they are transmitted either in a MIB or in a SIB.

According to some embodiments of the invention the control data contains at least a resource allocation information, said resource being allocated for control.

According to some embodiments of the invention the control data contains at least a service information for eMBMS services. The service information for eMBMS services being operated in an Single Frequency Network (SFN); in a SFN, several or all transmitters are synchronized and transmit exactly the same radio signal. This control data, which is Multicast Control Channel Information, enables the user equipments to know which multicast services are currently available in the SFN cells. This control data is transmitted in a MCCH (Multicast Control Channel).

According to some embodiments of the invention the service of the first and second cells is a SC-PTM service and wherein the control data contains at least a resource allocation information related to the SC-PTM service. Single Cell Point To Multipoint (SC-PTM) services are broadcast or at least multicast services.

A second aspect of the invention concerns a computer program product comprising code instructions to perform the method as describe previously when said instructions are run by a processor.

A third aspect of the invention concerns a hybrid wireless/broadcast network system, said network system comprising a broadcast network dedicated to transmission of broadcast services through at least a broadcast cell and a wireless network dedicated to transmission of at least a service through a plurality of cells, a cover area of the broadcast cell covering, at least partially, a cover area of a first cell and a cover area of a second cell among the plurality of cells, the system comprising at least one network entity comprising:
  a wireless/broadcast network interface;
  a processor configured for:
    when control data related to a service of the first cell is identical to control data related to a service of a second cell, sending instructions to the broadcast network to send the control data through the broadcast cell.

According to some embodiments of the invention the processor is further configured for:
  when control data related to a service of the first cell is identical to control data related to a service of a second cell, sending instructions to the wireless network to inhibit sending of the control data through the first and/or second broadband cell.

This enables to avoid sending the common control data through the wireless network in addition to sending it through the broadcast network. Sending the common control data through the wireless network in addition to the broadcast network may cause interferences.

The present invention is illustrated by way of example, and not by way of limitation, in the figures of the accompanying drawings, in which like reference numerals refer to similar elements and in which.

Figure 4:
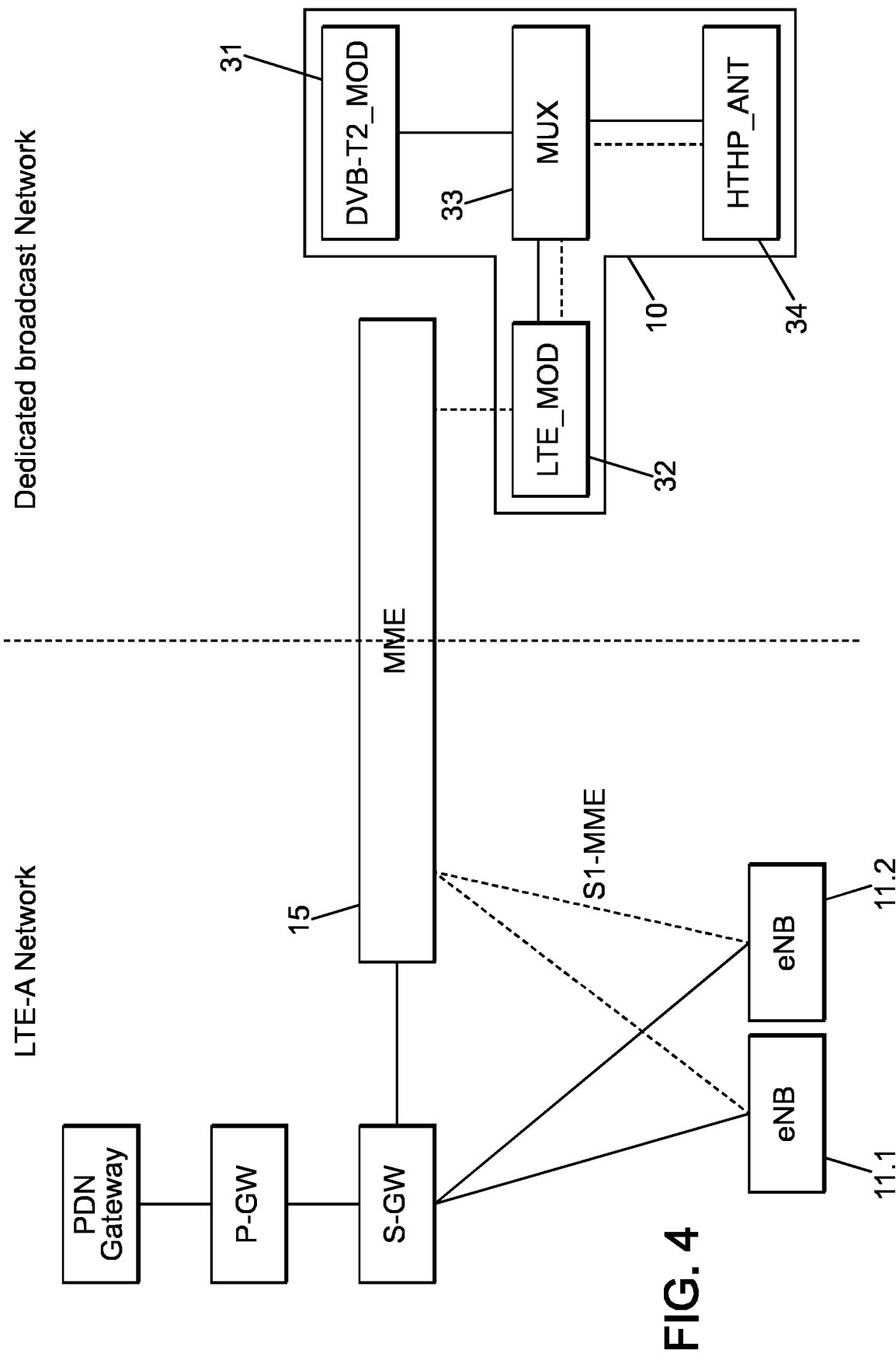
Figure 5:
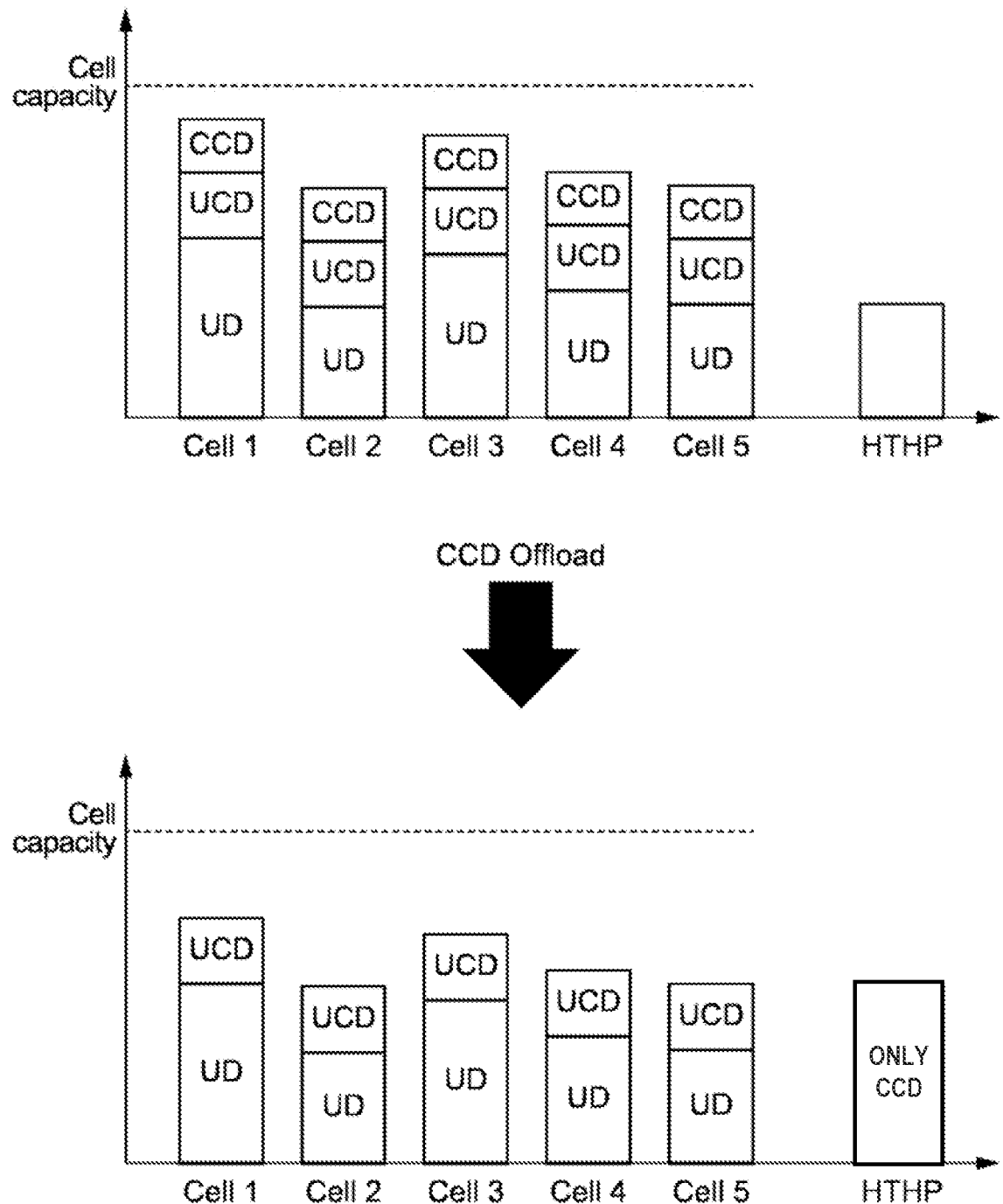
Figure 6:
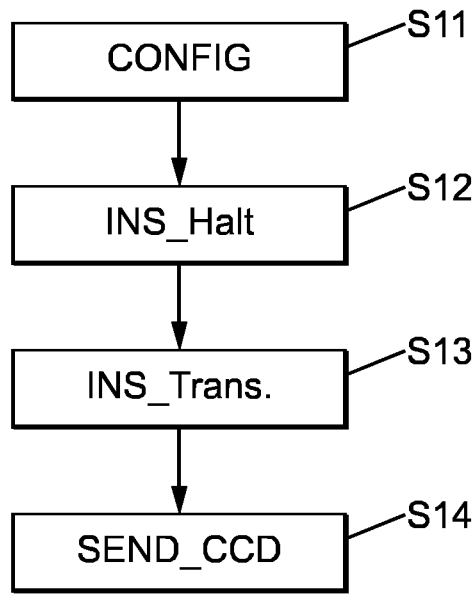
Figure 7:
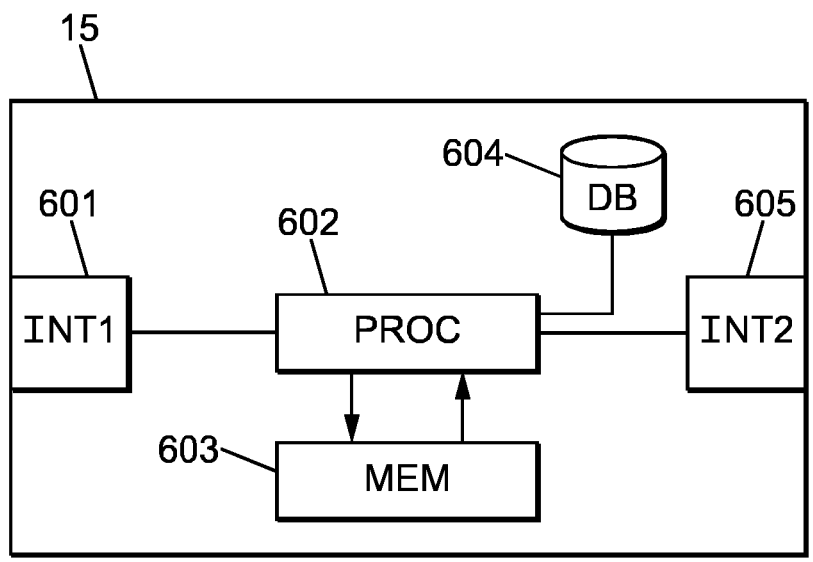

FIG. 4 schematizes an architecture of a Tower Overlay over LTE-A+ network system, comprising a TOol+ layer and a LTE-Advanced/eMBMS layer;

FIG. 5 schematizes the offloading of the common control data according to some embodiments of the invention;

FIG. 6 is a flowchart illustrating the steps of a method according to some embodiments of the invention;

FIG. 7 illustrates a structure of a network entity according to some embodiments of the invention.

Figure 1:
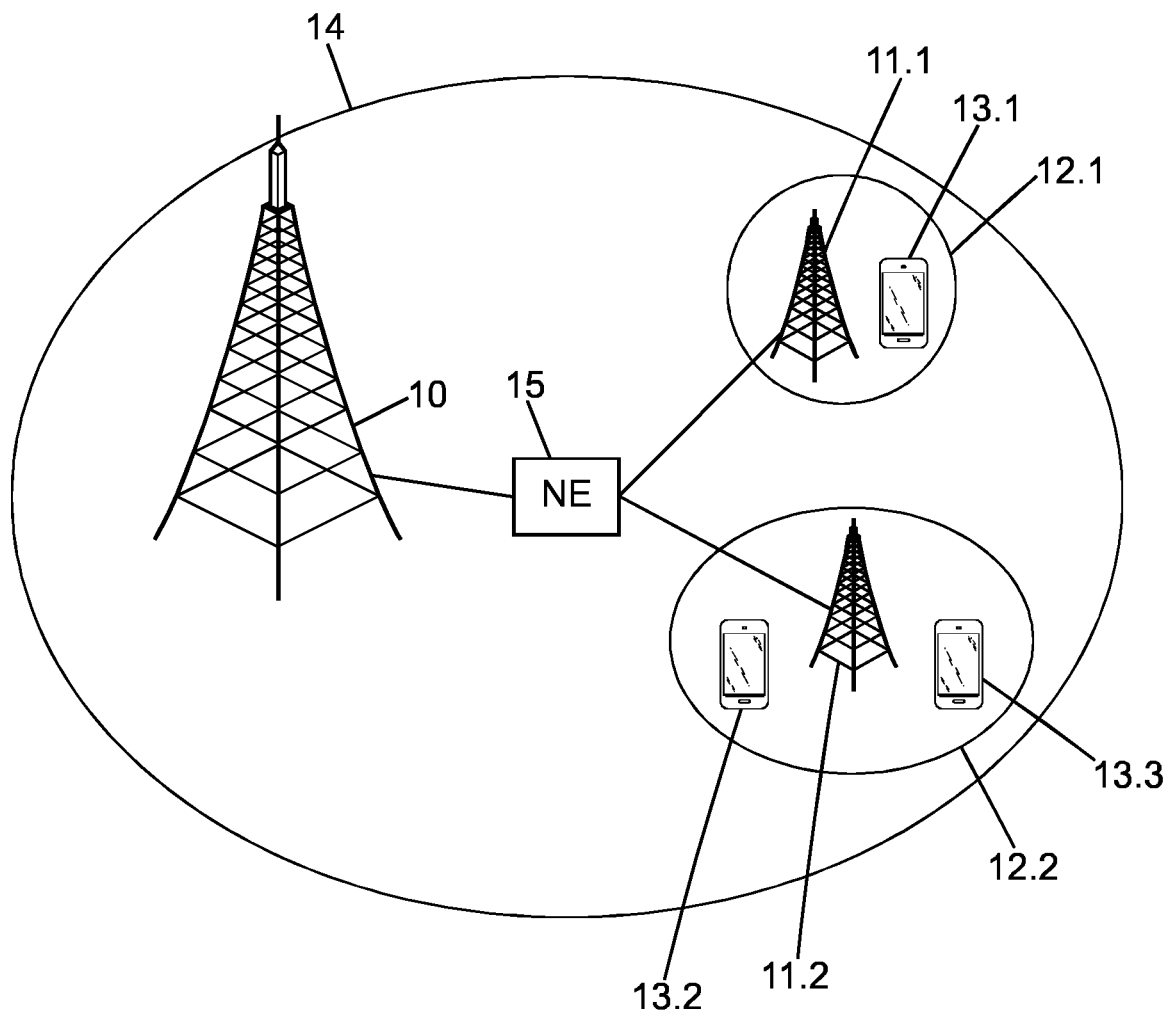
FIG. 1 illustrates a network according to some embodiments of the invention.

Referring to FIG. 1, there is shown a Tower Overlay over LTE-A+ system, called TOoL+ system, which comprises a HTHP transmitter 10 of a broadcast network having a first coverage area 14, and several nodes 11.1 and 11.2 of a wireless network, such as an LTE-A mobile broadband network, the nodes 11.1 and 11.2 having respective second coverage areas 12.1 and 12.2. Nodes 11.1 and 11.2 can be base stations, which are called eNodeBs (also referred as eNBs) under LTE-A specifications.

A terminal 13.1 can be located inside the second coverage area 12.1 and inside the first coverage area 14, so as to receive both services provided by the HTHP transmitter 10 and by the eNodeB 11.1. Terminals 13.2 and 13.3 can be located inside the second coverage area 12.2 and inside the first coverage area 14, so as to receive both services provided by the HTHP transmitter 10 and by the eNodeB 11.2. In the context of LTE-A, the terminals are user equipment, UE.

LTE-A+ designates transmission of LTE-A services via the HTHP transmitter 10. These services can be received and decoded by any LTE-A terminal, that is a user equipment.

The example of a TOoL+ system is considered hereafter, for illustrative purposes. However, the invention applies to any hybrid wireless/broadcast network and is not restricted to the TOoL+ system.

Indeed, the hybrid wireless/broadcast network or network system encompasses any network or network system that provides at least one broadcast layer supporting transportation of at least one broadcast service through a cell covering a plurality of cells through which at least one service is transported.

However, in what follows, we mainly (but not exclusively) consider, for illustrative purpose only, a hybrid wireless/broadcast network that is a TOoL+ system, whereby the broadcasting parameters are those of the HTHP transmitter 10.

A broadcast network designates a network, which is originally designed to be dedicated to services other than unicast services, such as broadcast or multicast services.

The principle of Tower Overlay over LTE-A+, TOoL+, is to offload data originally transmitted through wireless networks, such as LTE networks, especially live video or other popular contents, to broadcast networks, for example networks initially dedicated to broadcast television services.

Therefore, LTE-A broadcast services that were originally transmitted by the mobile network, using enhanced Multimedia Broadcast Multicast Service, eMBMS, for example, can be transmitted by an HTHP transmitter 10 instead of an eNodeB 11.1-11.2 of the LTE-A mobile broadband network.

According to the invention, the hybrid wireless/broadcast network comprises a network entity 15, which will be detailed hereafter, and which is in charge of instructing the eNodeB 11.1-11.2 to inhibit the sending of common control data and instructs the HTHP transmitter 10 to send these common control data.

Figure 2:
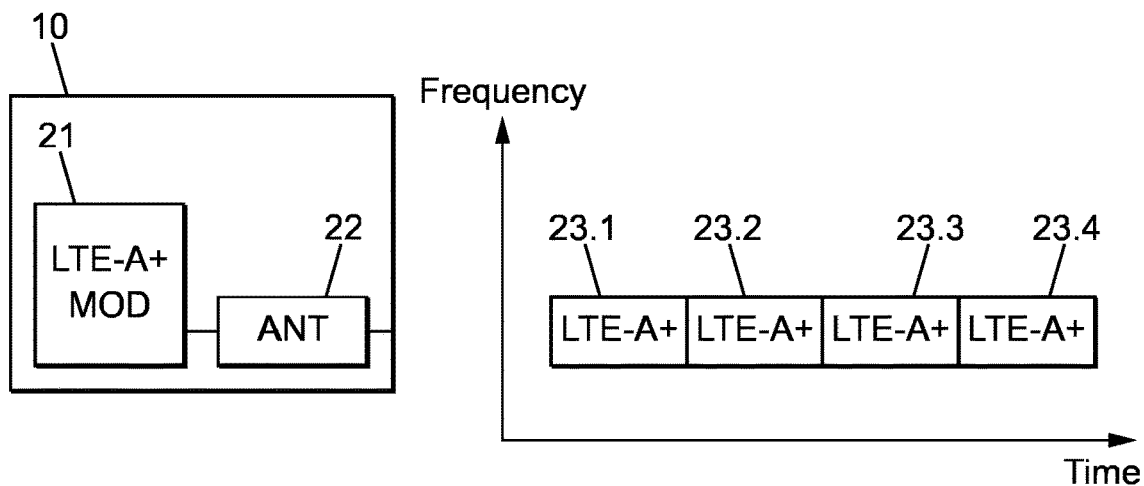
FIG. 2 represents a HTHP transmitter according to a first scenario.
Figure 3:
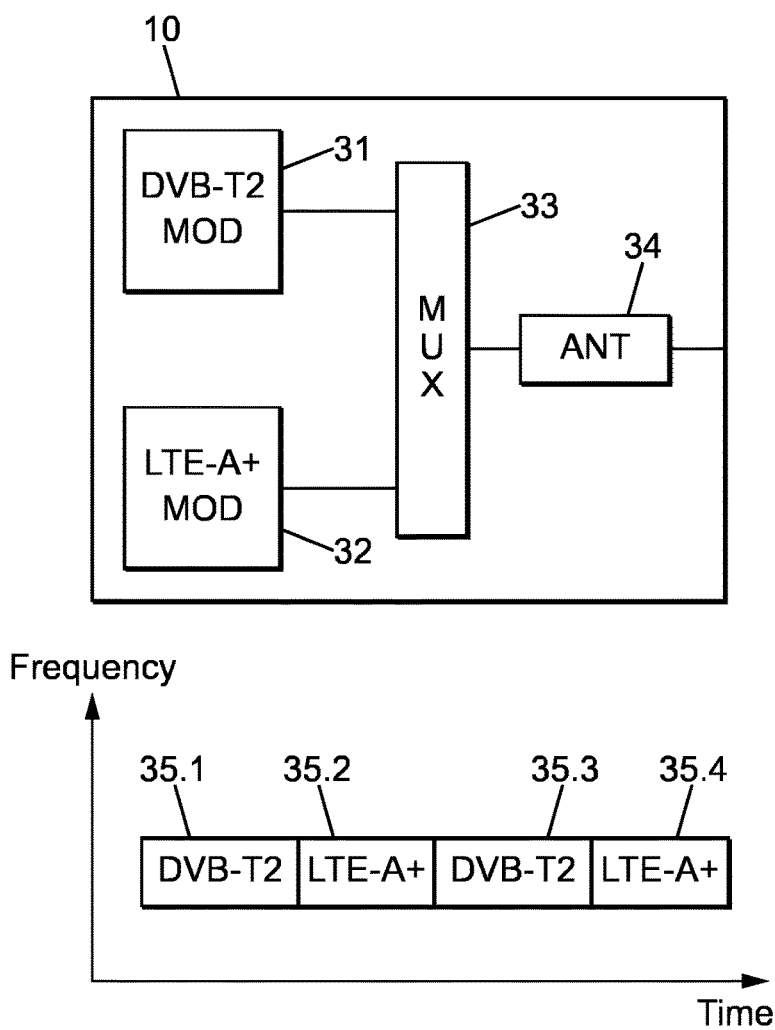
FIG. 3 represents a HTHP transmitter according to a second scenario.

The TOoL+ system according to the invention encompasses at least two HTHP scenarios that are illustrated on FIGS. 2 and 3.

According to a first scenario that is illustrated on FIG. 2, the broadcast network comprising the HTHP transmitter 10 carries LTE-A+ broadcast services only. In that case, the HTHP transmitter 10 comprises a LTE-A+ modulator 21 and an antenna 22. The LTE-A+ modulator 21 is arranged to receive data, such as user data or control data, to be encoded in a format that satisfies the LTE-A specifications.

In that example, all the time-frequency resources of the HTHP transmitter 10 are dedicated to the transportation of LTE-A+ broadcast content and/or control data, thereby addressing all UEs that are compatible with the LTE-A specifications and within the first coverage area 14. Therefore, the antenna 22 broadcasts only LTE-A+ frames 23.1-23.4 in the first coverage area 14.

According to a second scenario that is illustrated on FIG. 3, the broadcast network carries both LTE-A+ broadcast services and DVB-T2 services.

To this end, the HTHP transmitter 10 comprises an LTE-A modulator 32 and a DVB-T2 modulator 31. The LTE-A+ modulator 32 is arranged to transmit data, such as user data or control data, encoded in a format that satisfies the LTE-A+ specifications. The DVB-T2 modulator 31 is arranged to transmit data, usually video data, encoded in a format that satisfies the DVB-T2 specifications.

The HTHP transmitter 10 may also comprise a multiplexer 33 to multiplex the data issued from the modulators 31 and 32 and to transmit the multiplexed data to an antenna 34.

For example, and as shown on FIG. 3, the data issued from the modulators 31 and 32 can be time-multiplexed, so that one or several DVB-T2 frames 35.1 and 35.3 are alternated with one or several LTE-A+ frames 35.2 and 35.4 when broadcasted by the antenna 34 in the first coverage area 11.

A single antenna 34 has been shown on FIG. 3. However, the invention is not restricted to this example and also encompasses the case where an antenna is dedicated to each of the modulators 31 and 32. In that case, the antennas need to be synchronized so as to ensure that the LTE-A+ frames and the DVB-T2 frames are timely alternated.

Of course, the HTHP transmitter 10 shown on FIG. 3 can also be used in the first scenario, and can alternate between the first and second scenarios upon demand. In addition, the HTHP transmitter 10 can alternate between more than two different services, or can alternate between services other than LTE-A+ and DVB-T2.

As explained above, the present invention enables to send common control data, such as a SIB-1 public land mobile network information, an absolute radio-frequency channel number, an MIB information, a SIB-1 scheduling information list, a SIB-15 MBMS Inter-frequency list, a SIB cross carrier signaling, a SIB-2 MBSFN subframe configuration or a SIB-13 MBSFN area information.

FIG. 4 schematizes an architecture of a Tower Overlay over LTE-A+ network system, according to some embodiments of the invention, comprising a broadcast network dedicated to transmission of broadcast services, which is a DVB-T2 network and wireless network dedicated to transmission of at least a service, which is a LTE-Advanced network.

This case represents the second scenario illustrated on FIG. 3. A person skilled in the art can easily transpose this case to the first scenario illustrated on FIG. 2.

The description of the architecture of the LTE-Advanced network is limited to the entities involved in the transmission of the common control data, for the sake of simplicity. These well-known entities in regard of the LTE-Advanced standard are the MME 15.1, the eNB 11.1 and 11.2.

The architecture of the DVB-T2 network is composed of the HTHP transmitter which is composed of a DVB-T2 modulator 31, a LTE-A+ modulator 32, a multiplexer 33 and a HTHP antenna 34. The DVB-T2 network comprises other well-known entities that are not directly involved in the transmission of the common control data through the HTHP transmitter 10. Therefore, these entities are not schematized in FIG. 4, for the sake of simplicity Tower Overlay over LTE-Advanced system uses additional entities to transmit the LTE-Advanced common control data, according to some embodiments. Therefore, a MME 15 of the LTE-Advanced network is configured to transmit to the LTE-A+ modulator 32 the control data to be emitted through the HTHP transmitter 10. The MME 15 according to the embodiments of the invention may be configured to instruct the eNBs 11.1 and 11.2 to halt transmission of common control data. These instructions may be sent to the eNBs 11.1 and 11.2 via the well-known S1-MME interfaces.

Regarding these embodiments of the invention the MME 15 can be seen as the network entity.

Referring to FIG. 5, which schematizes the offloading of the common control data, there is shown the user data (UD) load, the user control data (UCD) load and common control data (CCD) load in several broadband cells. The covering area of these cells are at least partially covered by the covering area of the cell of the broadcast cell, that is the broadcast cell is using, as an antenna, a high tower high power (HTHP).

In this case five cells are represented, but the number of cells is only limited by the size of the covering area of the broadcast cell compared to the size of the covering area of the cells.

It is also shown the load of data transmitted through the HTHP.

When the common control data is sent through the HTHP instead of the cells, then each cell only emits the user data and the user control data, but no longer the common control data. Thus the load of each cell is reduced of the size of the common control data, and the load of the wireless network is reduced from the combined load reduction of each cell. Therefore, the offload depends on the number of cells, which covering areas are covered by the covering area of the broadcast cell. On the other side the load of the broadcast cell only increases of the size of the common control data.

The risk of reaching the cell capacity, that is, the situation where all the radio resources (that is the subcarriers in the case of LTE) assigned to the cell are used to transmit data (control data or user data), is reduced and each cell may thus be able to send more data, as UCD or UD.

FIG. 6 is a flowchart illustrating the steps of a method according to some embodiments of the invention.

At step S11, previously to the steps described hereafter, which illustrates the embodiments according to the invention, the control data which will be transmitted through the HTHP transmitter 10 is determined. In addition, the time and frequency to which the control data is sent through the HTHP transmitter 10 are determined. This frequency may be determined outside the frequency ranges of the eNodeB 11.1-11.2, to maximize the reduction of the load of the eNodeB 11.1-11.2. The allocation information must be adapted to take into account these time and frequency modification, which is well-known and is commonly implemented when transmitting data to user equipment (13.1, 13.2, 13.3) in the LTE standard.

Determining the control data sent by the HTHP transmitter 10 consists in selecting the control data that are intended to be sent through several eNBs at the same time. Those control data are hereinafter referred to as common control data. For example the common control data may be a SIB-1 public land mobile network information, an absolute radio-frequency channel number, an MIB information, a SIB-1 scheduling information list, a SIB-15 MBMS Inter-frequency list, a SIB cross carrier signaling, a SIB-2 MBSFN subframe configuration or a SIB-13 MBSFN area information. The common control data sent according to the invention is not limited to the above mentioned common control data.

All control data identically sent via several eNBs to all, or at least some of the user equipments in each of the coverage areas of those eNBs may be common control data. These common control data are encompassed in the scope of the invention. For example common control data may be service information for eMBMS services being operated in an SFN. This control data is Multicast Control Channel Information, used by the receiving device to know which multicast services are currently available in the eNodeB 11.1-11.2. This control data is transmitted in the MCCH (Multicast Control Channel). As the information is identical in the eNodeB 11.1-11.2, it can be easily offloaded to the HTHP transmitter 10. In another example, common control data may contain resource allocation information related to the SC PTM service. The user data sent through this service may be identical in each eNodeB 11.1-11.2. Therefore, the Resource allocation information received by the user equipments is the same in each eNodeB 11.1-11.2.

Common control data are sent identically throughout several eNBs, therefore being intended to be sent to all the user equipment in several coverage areas.

At step S12, the network entity 15 sends instructions to the eNBs 11.1 and 11.2 to inhibit transmission of common control data. That is when control data is intended to be sent at the same time to all the user equipment in the second coverage area 12.1, or at least one user equipment in this area, and to all the user equipment in the second coverage area 12.2, or at least one user equipment in this area, the network entity 15 sends instructions to the eNBs 11.1 and 11.2. These instructions instruct the eNBs 11.1 and 11.2 to inhibit transmission of specific common control data. Indeed, each eNB is in charge of the common control data sent to all the user equipment included in its coverage area. Optionally, to make the reception by the user equipments 13.1-13.3 of the common control data easier, a new information field may be added in the SIB-1 transmitted through the eNBs 11.1 and 11.2 to indicate that the common control data is now available on the radio channel of the HTHP transmitter 10, that is the common control data is transmitted through the HTHP transmitter 10. In this case the SIB-1 are transmitted through the eNBs 11.1 and 11.2.

At step S13, the network entity 15 sends instructions to the HTHP transmitter 10. Said instructions instruct the transmitter 10 to broadcast the specific control data to the user equipment in the coverage area 14 of the HTHP transmitter 10.

The instructions may for example:
 include the common control data which is sent to the LTE-A+ modulator 32 in a time period according to the time period in which the common control data has to be sent through the HTHP transmitter 10; or
 correspond to instructions pointing the common control data, for example by sending an index number corresponding to a specific control data. These instructions may include a time period stipulating the time period in which the specific control data has to be sent through the HTHP transmitter 10.

In those two cases the implementation is identical or at least similar.

The time period in which the specific control data has to be sent through the HTHP transmitter 10 may be the same as the time period in which the specific control data would have been sent through the eNBs 11.1 and 11.2. It is especially the case for the transmission of the SIB-1 through the HTHP transmitter 10, which needs to comply with a fixed scheduling. However, the time period may be different from the period in which the specific control data would have been sent through the eNBs 11.1 and 11.2. For example, other SIB than SIB-1 do not have specific time periods.

To address to the user equipments the information about the resource allocation used for transmitting the common control data through the HTHP transmitter 10, the SIB-1 which is transmitted through the eNBs 11.1 and 11.2, may include these additional information.

At step S14, the control data is sent by the HTHP transmitter 10. The control data is sent using time-frequency resources from the HTHP transmitter 10 that have been determined previously. By decoding the HTHP radio channel corresponding to these time-frequency resources, the user equipment 13.1-13.3 retrieves the common control data. The user equipments involved are all the user equipments in the coverage areas of eNBs which have been instructed to halt the sending of common control data. In the case where an eNB, whose coverage area is not completely covered by the coverage area 14 of the HTHP transmitter 10, it should receive an instruction from the MME to continue the sending of common control data.

The user equipments 13.1-13.3 may listen and/or decode time-frequency resources of the radio channels of both the eNBs (11.1, 11.2) and the HTHP transmitter 10 likely to include the common control data. Therefore, no specific resource allocation information is needed.

On the over hand, the new information field added in the SIB-1 (described in step S12), that are transmitted through the eNBs 11.1 and 11.2, may enable the user equipments to avoid listening and decoding both the radio channel of the eNBs (11.1, 11.2) and the radio channel of HTHP transmitter 10, thus improving the reception process.

FIG. 7 illustrates a structure of a network entity according to some embodiments of the invention.

The MME also named network entity 15 comprises a random access memory 603 and a processor 602 that can execute instructions to perform at least step S12 and S13 as described above.

The network entity 15 also comprises a database 604. The database 604, according to some embodiments, can store the operations to be executed by the processor 602 so as to perform at least step S12 and S13.

The network entity 15 may further comprise a first network interface 601 for communicating with at least one eNB, and preferably with several eNBs. The network entity 15 may comprise a network interface dedicated for each of the eNodeBs with which it communicates.

The network entity 15 may further comprise a second network interface 605 for communicating with the HTHP transmitter 10.

The invention claimed is:

1. A method for transmitting control data in a hybrid broadband/broadcast network system, said network system comprising a broadcast network dedicated to transmission of broadcast services through at least one broadcast cell and a wireless cellular network dedicated to transmission of at least a service through a plurality of cells, a coverage area of the at least one broadcast cell covering, at least partially, a coverage area of a first cell and a coverage area of a second cell among the plurality of cells, said method comprising:
    determining whether common control data is transmitted using the wireless cellular network, wherein common control data comprises control data related to a service that is provided by or through the first cell and by or through the second cell; and
    based on determining that common control data is transmitted using the wireless cellular network, offloading the common control data from the wireless cellular network to the broadcast network, including transmitting, using the broadcast network, the common control data through the at least one broadcast cell, while user data and user specific control data are transmitted using the wireless cellular network, respectively through the first cell and the second cell.

2. The method according to claim 1, wherein transmission of the broadcast services through the at least one broadcast cell is performed via a high tower high power broadcast network.

3. The method according to claim 1, wherein the common control data is data related to a wireless network configuration.

4. The method according to claim 1, wherein the common control data is data related to a configuration of multicast services.

5. The method according to claim 1, wherein the wireless cellular network is a LTE-Advanced network.

6. The method according to claim 5, wherein the common control data is transmitted in a system information block, SIB, or a Master Information Block, MIB.

7. The method according to claim 5, wherein the common control data contains at least a SIB-1 public land mobile network information, an absolute radio-frequency channel number, an MIB information, a SIB-1 scheduling information list, a SIB-15 MBMS Inter-frequency list, a SIB cross carrier signaling, a SIB-2 MBSFN subframe configuration or a SIB-13 MBSFN area information.

8. The method according to claim 5, wherein the common control data contains at least a service information for eMBMS services.

9. The method according to claim 5, wherein the service of the first and second cells is a SC PTM service and wherein the common control data contains at least a resource allocation information related to the Single Cell Point To Multipoint, SC PTM, service.

10. The method according to claim 1, wherein the common control data contains at least a resource allocation information, said resource being allocated for control.

11. The method according to claim 1, wherein the wireless cellular network is a broadband network dedicated to transmission of at least an unicast service through the plurality of cells and the service of the first and second cells is the unicast service.

12. A non-transitory computer-readable medium comprising instructions stored thereon, which when executed by a processor implement a method for transmitting control data in a hybrid broadband/broadcast network system, said network system comprising a broadcast network dedicated to transmission of broadcast services through at least one broadcast cell and a wireless cellular network dedicated to transmission of at least a service through a plurality of cells, a coverage area of the at least one broadcast cell covering, at least partially, a coverage area of a first cell and a coverage area of a second cell among the plurality of cells, said method comprising:
    determining whether common control data is transmitted using the wireless cellular network, wherein common control data comprises control data related to a service that is provided by or through the first cell and by or through the second cell; and
    based on determining that common control data is transmitted using the wireless cellular network, offloading the common control data from the wireless cellular network to the broadcast network, including transmitting, using the broadcast network, the control data through the at least one broadcast cell, while user data and user specific control data are transmitted using the wireless cellular network, respectively through the first cell and the second cell.

13. The non-transitory computer-readable medium according to claim 12, wherein transmission of the broadcast services through the at least one broadcast cell is performed via a high tower high power broadcast network.

14. The non-transitory computer-readable medium according to claim 12, wherein the control data is data related to a wireless network configuration.

15. The non-transitory computer-readable medium according to claim 12, wherein the control data is data related to a configuration of multicast services.

16. A hybrid wireless/broadcast network system, said network system comprising a broadcast network dedicated to transmission of broadcast services through at least one broadcast cell and a wireless cellular network dedicated to transmission of at least an unicast service through a plurality of cells, a coverage area of the at least one broadcast cell covering, at least partially, a coverage area of a first cell and a coverage area of a second cell among the plurality of cells, the system comprising at least one network entity comprising:
    a wireless/broadcast network interface; and
    a processor configured for implementing a method for transmitting control data, comprising:
    determining whether common control data is transmitted using the wireless cellular network, wherein common control data comprises control data related to a service that is provided by or through the first cell and by or through the second cell; and
    based on determining that common control data is transmitted using the wireless cellular network, offloading the common control data from the wireless cellular network to the broadcast network, including transmitting, using the broadcast network, the common control data through the at least one broadcast cell, while user data and user specific control data are transmitted using the wireless cellular network, respectively through the first cell and the second cell.

17. The hybrid wireless/broadcast network system according to claim 16, wherein the processor is further configured for:
    when control data related to a service provided by or through the first cell is identical to control data related to a service provided by or through the second cell, sending instructions to the wireless cellular network to inhibit transmission of the control data through the first and/or second cell.

18. The hybrid wireless/broadcast network system according to claim 16, wherein transmission of the broadcast services through the at least one broadcast cell is performed via a high tower high power broadcast network.

19. The hybrid wireless/broadcast network system according to claim 16, wherein the control data is data related to a wireless network configuration.

20. The hybrid wireless/broadcast network system according to claim 16, wherein the control data is data related to a configuration of multicast services.

* * * * *